United States Patent
Matsuoka et al.

(10) Patent No.: US 11,247,293 B2
(45) Date of Patent: Feb. 15, 2022

(54) SPOT WELDMENT

(71) Applicants: KABUSHIKI KAISHA TOYOTA CHUO KENKYUSHO, Nagakute (JP); TOYOTA JIDOSHA KABUSHIKI KAISHA, Toyota (JP)

(72) Inventors: Hideaki Matsuoka, Nagakute (JP); Tatsuyuki Amago, Nagakute (JP); Takashi Asada, Nagakute (JP); Toru Hioki, Miyoshi (JP); Manabu Ooga, Toyota (JP); Shuhei Ogura, Nagakute (JP)

(73) Assignees: KABUSHIKI KAISHA TOYOTA CHUO KENKYUSHO, Nagakute (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 274 days.

(21) Appl. No.: 16/576,023

(22) Filed: Sep. 19, 2019

(65) Prior Publication Data
US 2020/0114458 A1 Apr. 16, 2020

(30) Foreign Application Priority Data
Oct. 16, 2018 (JP) .............................. JP2018-195320

(51) Int. Cl.
*B23K 11/11* (2006.01)
*B23K 11/30* (2006.01)
(Continued)

(52) U.S. Cl.
CPC ............. *B23K 11/115* (2013.01); *B23K 11/20* (2013.01); *B23K 11/3009* (2013.01); *B23K 35/0261* (2013.01)

(58) Field of Classification Search
CPC ... B23K 11/115; B23K 11/166; B23K 11/185; B23K 11/20; B23K 11/3009;
(Continued)

(56) References Cited

FOREIGN PATENT DOCUMENTS

| JP | S56-39179 A | 4/1981 |
|---|---|---|
| JP | H04-83486 U | 7/1992 |

(Continued)

OTHER PUBLICATIONS

Dec. 1, 2020 Office Action issued in Japanese Patent Application No. 2018-195320.

*Primary Examiner* — Dana Ross
*Assistant Examiner* — Joseph W Iskra
(74) *Attorney, Agent, or Firm* — Oliff PLC

(57) ABSTRACT

A highly corrosion-resistant spot weldment can be produced at low cost without occurrence of prominent protrusions and the like on the surface. The spot weldment is joined by a nugget formed inside stacked sheet materials through bringing a pair of electrodes arranged opposite to each other into pressure contact with the stacked sheet materials from outside and energizing the stacked sheet materials from the electrodes. The nugget has a diameter that is $\geq 4\sqrt{t}$ (t: thickness of sheet material) and a flattening level of 3.5 to 8, which is a ratio of diameter to thickness. Both outer surface parts of the sheet materials are free from protrusions formed due to bulging of molten metal. Even when the electrodes are made of a copper alloy, the increased amount of Cu in the outer surface parts is 0.2 mass % or less with respect to the component composition before spot welding.

9 Claims, 7 Drawing Sheets

(51) Int. Cl.
*B23K 11/20* (2006.01)
*B23K 35/02* (2006.01)

(58) Field of Classification Search
CPC ............ B23K 2103/04; B23K 2103/10; B23K 2103/18; B23K 35/0261
USPC ....................................................... 219/91.2
See application file for complete search history.

(56) References Cited

FOREIGN PATENT DOCUMENTS

| | | | |
|---|---|---|---|
| JP | H10-244379 | A | 9/1998 |
| JP | 2003-164975 | A | 6/2003 |
| JP | 2003164975 | * | 6/2003 |
| JP | 2004-276058 | A | 10/2004 |
| JP | 2006-224127 | A | 8/2006 |
| JP | 2007-321182 | A | 12/2007 |
| JP | 2010-131666 | A | 6/2010 |
| JP | 2010131666 | * | 6/2010 |
| JP | 6136249 | B2 | 5/2017 |

* cited by examiner

FIG.1A
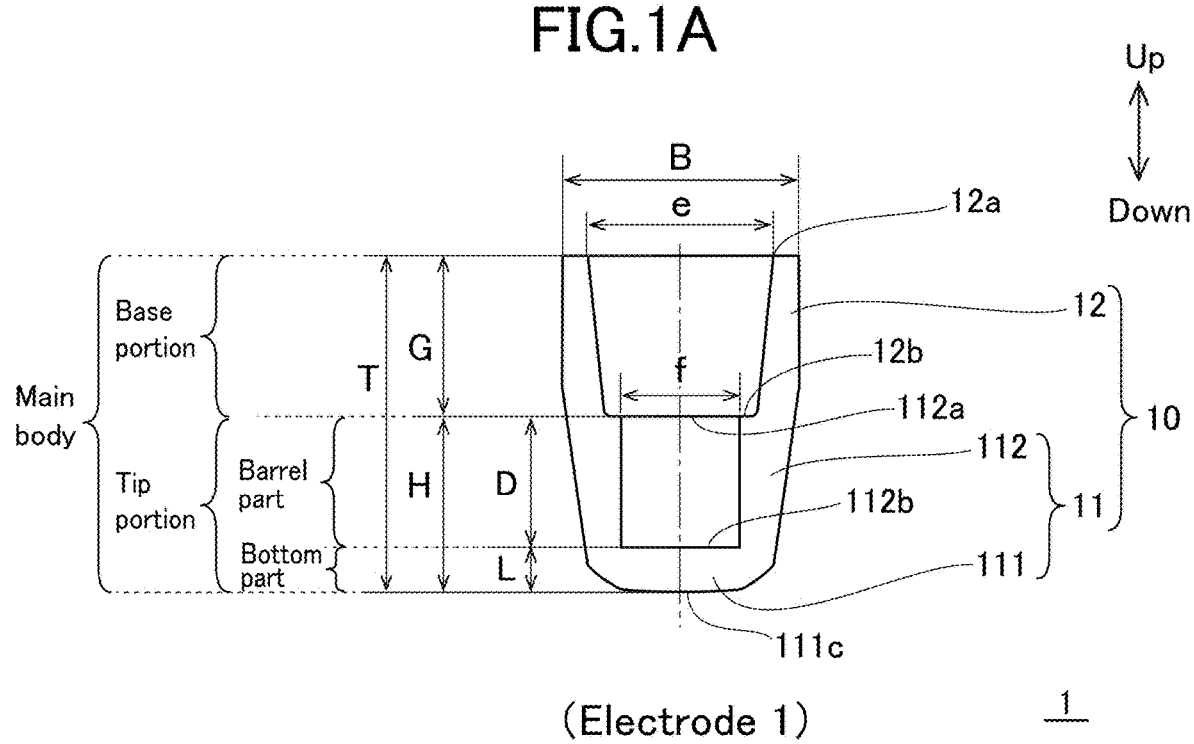
(Electrode 1)
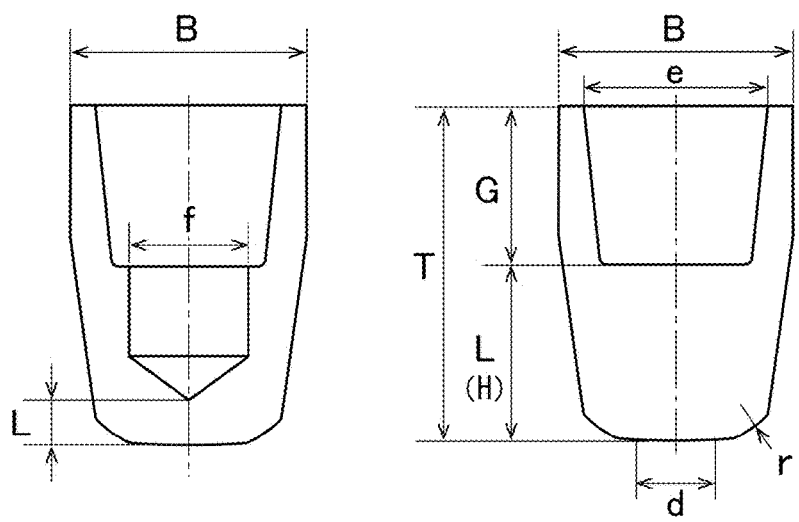
(Electrode 2)     (Electrode C)

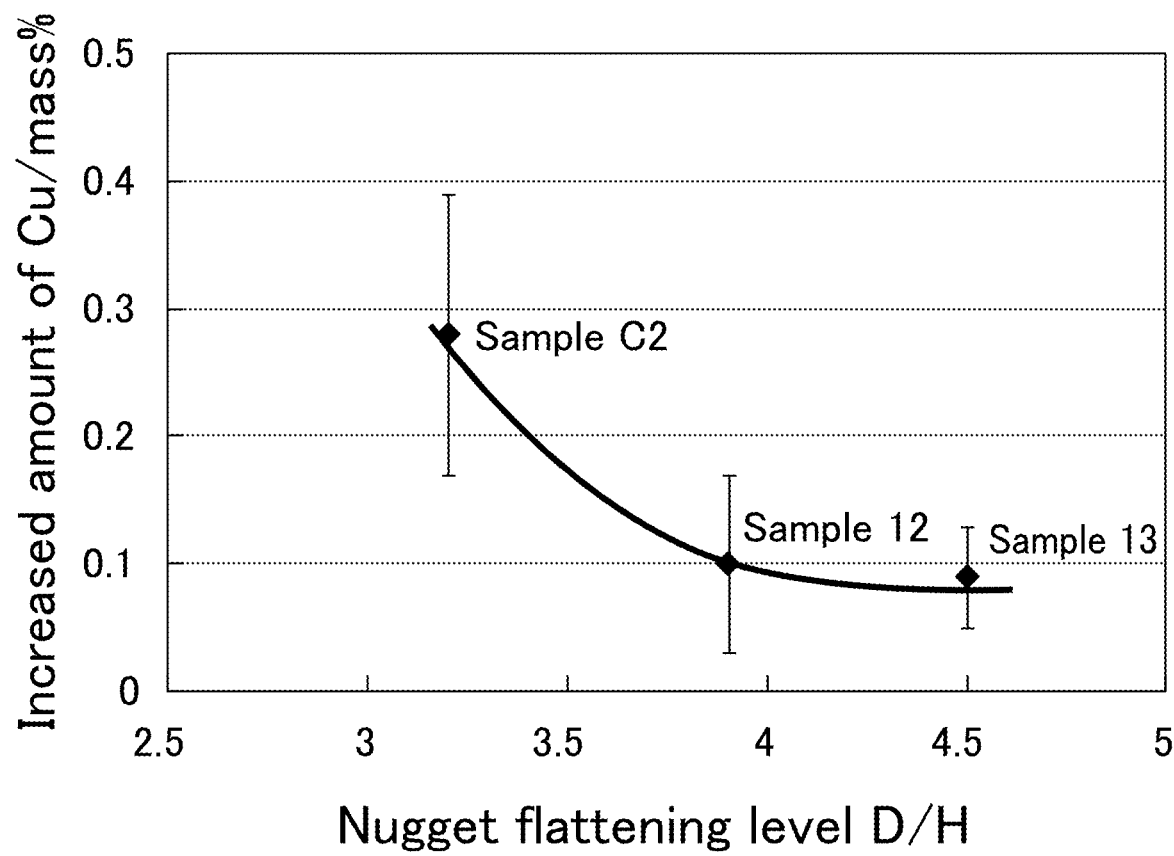

(Electrode C)                (Electrode 1)

FIG.4
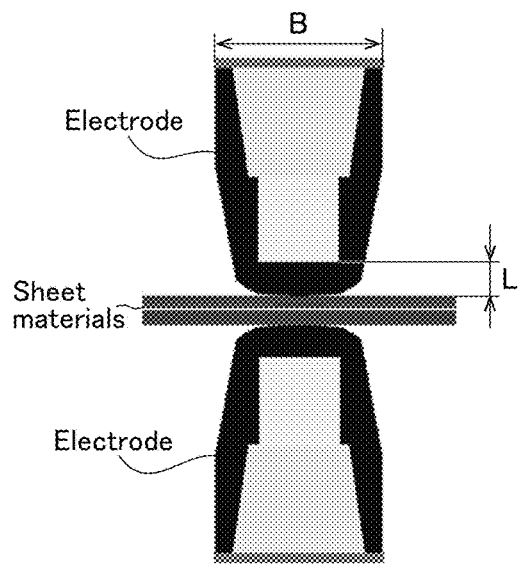
Analysis model
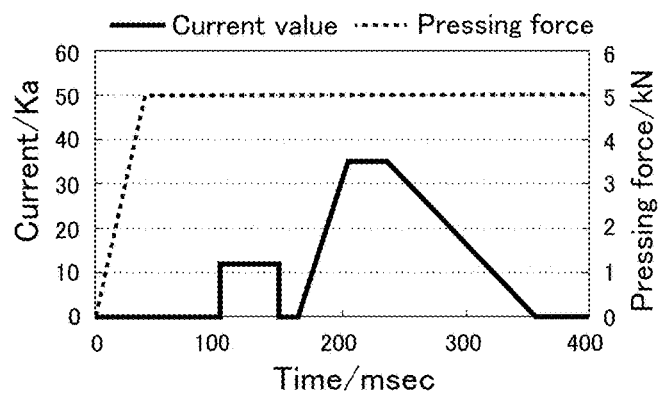
Energization/pressing force patterns
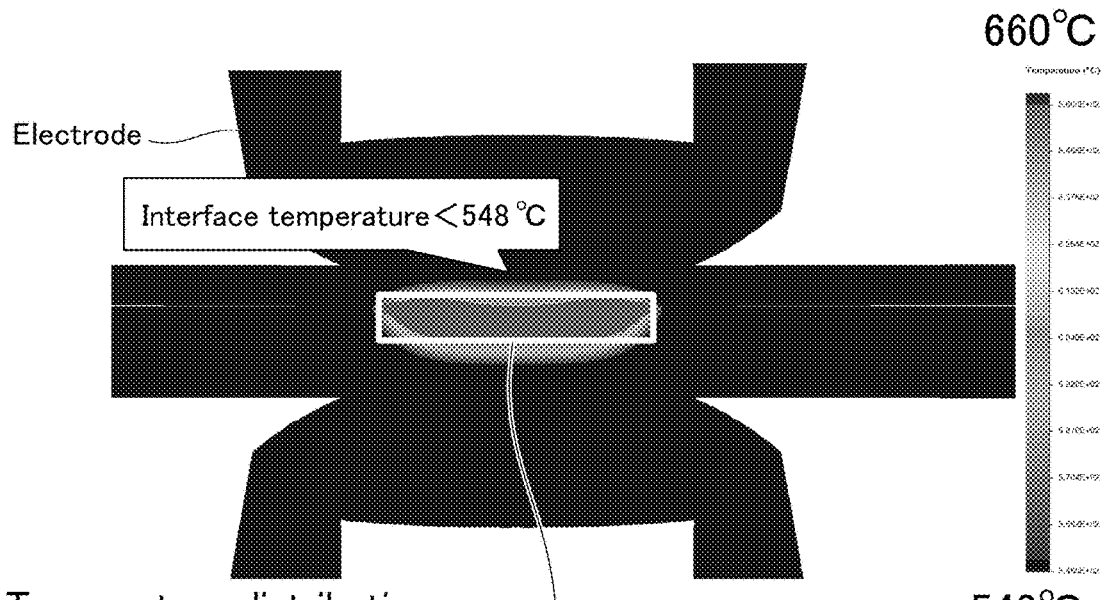
Temperature distribution
Nugget diameter: 6.3 mm
Nugget thickness: 1.0 mm (Electrode 3)

SPOT WELDMENT

TECHNICAL FIELD

The present invention relates to a spot weldment obtained by spot welding of two or more stacked sheet materials and relevant techniques.

BACKGROUND ART

When joining two or more materials together, welding is often used to ensure the high joint strength. For example, sheet materials that constitute a vehicle body or the like of an automobile are joined by spot welding that allows a plurality of sites (spots) to be welded in a spot-like form.

The spot welding is a type of resistance welding performed such that both outer surfaces of workpieces to be joined (materials to be joined, such as sheet materials) are pressed (applied with pressing force) between a pair of electrodes arranged opposite to each other and, in this state, the workpieces to be joined are supplied with a large current via the electrodes for a short time. When performing the spot welding, the workpieces to be joined as such are melted and solidified to form a nugget inside the workpieces. The workpieces are thus joined to each other via the nugget. Many proposals for the spot welding have been made, and relevant descriptions are found, for example, in the patent documents listed below.

PRIOR ART DOCUMENTS

Patent Documents

[Patent Document 1] JP6136249B
[Patent Document 2] JP10-244379A
[Patent Document 3] Published Utility Model Application No. 4-83486

SUMMARY OF INVENTION

Technical Problem (1) Patent Document 1 proposes a concave electrode (an electrode with a recessed central area of the pressure-contact surface to a workpiece to be joined) that can form a sufficiently large nugget while suppressing the occurrence of expulsion (a phenomenon in which the expanded molten metal spatters around the spot). Use of the concave electrode allows the molten metal, which is generated inside the workpieces during the spot welding, to bulge out to the recessed side of the electrode. This can suppress the occurrence of expulsion, and the desired joint strength can be stably ensured.

However, as will be understood, the nugget formed in the above process may take a form in which the bulging molten metal is directly solidified. When the concave electrode is used, therefore, protrusions may appear on the outer surface of the welded sheet materials. Such protrusions may cause deterioration of the appearance of a weldment, poor workability in the subsequent steps, etc.

(2) Patent Document 2 proposes an electrode for resistance spot welding of aluminum-based workpieces to be joined. Specifically, this document proposes an electrode that is made of a material (pure copper such as tough pitch copper or oxygen-free copper) with a high conductivity (97% IACS or more) and little resistance heat generation and that is provided inside with a small cooling hole. This electrode has high cooling efficiency, and the temperature rise of the pressure-contact surface in contact with a workpiece to be joined can be suppressed.

However, the conductivity of pure copper is high, but the strength is low. For example, the strength at 200° C. or lower is only about ½ as compared with copper alloys (such as chromium copper). If an electrode made of such a material is pressed with a large pressing force against a workpiece to be joined, buckling tends to occur at the outer circumferential side wall part around the small cooling hole, and the tip portion may readily be deformed and worn as the number of welding points increases. In order to stably form a desired nugget, it is necessary to frequently perform exchange of electrodes, reform (dressing) of the tip portion, etc. This may lead to the reduction in productivity and the increase in production cost due to the increase in tact time.

(3) Patent Document 3 (FIG. 10) discloses a bottomed cylindrical electrode for spot welding made of a copper alloy (chromium copper or alumina-dispersed copper). Copper alloys have higher strength (higher hardness) than pure copper, but the conductivity is low. Moreover, the electrode is thinner to some extent at the bottom part and cylindrical part as a whole. Accordingly, due to the combination of the material and the shape, the electrode of Patent Document 3 (FIG. 10) may readily be self-heated and softened when a large current is applied. This softening may also readily cause buckling when such an electrode is pressed with a large pressing force against a workpiece to be joined. Even if buckling does not occur, the electrode may readily be deformed as the number of welding points increases, and the frequency of exchange and reform of electrodes can increase as described above.

Furthermore, due to the temperature rise caused by the self-heating of the electrode, the temperature of the contact interface with a workpiece to be joined also rises, and a compound may readily be generated between the electrode and the workpiece to be joined. Generation of such a compound may lead to welding troubles such as pickup and welding adhesion. When the workpiece to be joined is an Al alloy material or a (high-tensile) steel sheet plated with zinc, Al—Si, or the like, a Cu-based compound may readily be generated due to the reaction in a molten state between Al or Zn on the side of the workpiece to be joined and Cu on the electrode side.

(4) In the automotive field, high-tensile steel sheets, aluminum alloy sheets, and other similar sheets are widely used for the purpose of weight reduction and the like, and spot welding thereof is also increasing. For the spot welding of high-tensile steel sheets, aluminum alloy sheets, and other similar sheets, a larger amount of heat (amount of heat (Q)=current value $(I)^2$×resistance value (R)×time (t)) than that for the spot welding of soft steel sheets is required. This is because the low resistance of aluminum alloy requires a large current. Such an increase in the amount of heat (amount of energization) may cause the temperature of electrodes to increase and the generated amount of compounds to increase.

Moreover, in general, when high-tensile steel sheets, aluminum alloy sheets, or other similar sheets having poor press formability (springback is large, for example) are stacked after the press forming, a gap larger than that in the conventional technique may readily be generated in the parts to be welded. If the spot welding is performed under the presence of a gap, spattering (expulsion) occurs, which may not only deteriorate the working environment but also make it difficult to form a stable welding nugget. In order to perform spot welding without the gap, it is necessary to apply a large pressing force to the electrodes so that the workpieces to be joined are pressed strongly between the electrodes. Thus, the amount of energization (amount of heat generation) and the pressing force applied to the electrodes tend to increase more than ever. On the other hand, there is also a demand for reducing the frequency of exchange and reform of the electrodes, etc.

Conventionally, when spot welding is performed using general convex electrodes that are not concave electrodes, cleaning (such as dressing or reform) and exchange of electrodes (tips) have to be frequently performed to stably form a nugget having a certain size or more to ensure the joint strength of a weldment. Such a tendency is remarkable when a compound or alloy may readily be formed at the contact interfaces between the electrodes and sheet materials.

The present invention has been made in view of such circumstances and objects of the present invention include providing a spot weldment that has good appearance without prominent protrusions and the like on the surface and that allows for reduction of the production cost, etc.

Solution to Problem

As a result of intensive studies to achieve the above objects, the present inventors have newly found that a spot weldment can be efficiently obtained without deterioration of the appearance by forming a nugget into a desired shape between sheet materials to be joined. Developing this achievement, the present inventors have accomplished the present invention as will be described hereinafter.

«Spot Weldment»

(1) The present invention provides a spot weldment joined by a nugget formed inside stacked sheet materials. The nugget is formed through bringing a pair of electrodes arranged opposite to each other into pressure contact with the stacked sheet materials from outside and energizing the stacked sheet materials from the electrodes. The nugget has a nugget diameter (D) satisfying $D \geq 4\sqrt{t}$ (t: thickness of sheet material) and a nugget flattening level (D/H) of 3.5 to 8. The nugget flattening level (D/H) is a ratio of the nugget diameter (D) to a nugget thickness (H). In this spot weldment, both outer surface parts of the sheet materials are free from protrusions formed due to bulging of molten metal.

(2) The spot weldment (simply referred to as a "weldment") of the present invention has a sufficient joint strength because the nugget having a certain size (nugget diameter) or more is formed between the sheet materials. Moreover, the weldment of the present invention has good appearance without prominent protrusions and the like on the outer surface after the spot welding.

In the weldment of the present invention, the sheet materials are joined by the flattened nugget having a relatively smaller nugget thickness than that of conventional ones. When such a flattened nugget is formed, the temperature of the contact interfaces between the electrodes and the sheet materials tends to decrease. This can suppress the migration (diffusion, penetration) of the component elements (e.g., Cu), which constitute the electrodes (tips), to the sheet material side and the generation or the like of a compound or alloy in the vicinity of the interfaces.

As a result, it is possible to suppress the deformation/wear of electrodes and reduce the frequency of cleaning (such as dressing or reform) and exchange of electrodes, etc. Moreover, the change in the component composition is reduced in the vicinity of the outer surface of the spot-welded sheets (weldment) and in the nugget, and the weldment having originally expected characteristics (such as strength and corrosion resistance) can readily be obtained. Thus, according to the present invention, a weldment excellent in the appearance and characteristics can be obtained at low cost.

«Spot Welding Method, etc.»

The present invention can also be perceived as a spot welding method (also simply referred to as a "welding method") with which the above-described weldment can be obtained. For example, the present invention can be perceived as a spot welding method using an electrode (tip) having a specific shape with which a flattened nugget is readily formed.

(1) The present invention may also provide, for example, a spot welding method performed using an electrode comprising a main body having a tip portion and a base portion. The tip portion is formed in a bottomed and substantially cylindrical shape. The base portion is formed in a substantially cylindrical shape and merges into the tip portion. The main body of the electrode comprises a copper alloy. The tip portion has a tip bottom part and a tip barrel part. The tip bottom part has a pressure-contact surface that is not recessed with respect to a workpiece to be pressed. The tip barrel part is formed in a substantially cylindrical shape and merges into the tip bottom part. The electrode has a tip inner diameter ratio (f/B) of 0.4 to 0.6. The tip inner diameter ratio (f/B) is a ratio of an inner diameter (f) of the tip barrel part to an outer diameter (B) of the base portion. The electrode has a tip bottom thickness ratio (L/B) of 0.15 to 0.5. The tip bottom thickness ratio (L/B) is a ratio of a thickness (L) of the tip bottom part to the outer diameter (B) of the base portion. The above-described spot weldment is obtained by this method.

(2) The electrode according to the present invention is made of a copper alloy and has a specific shape. Such material and form act synergistically to allow the electrode to be less susceptible to deformation such as buckling even when a large pressing force is applied. Furthermore, the electrode tends to suppress the temperature rise at the contact interface between the electrode and a workpiece to be joined, owing mainly to the form of the electrode. This can suppress the migration (diffusion, penetration) of the component elements (e.g., Cu), which constitute the electrode (tip), to the sheet material side and the generation or the like of a compound or alloy in the vicinity of the interface. In this way, when the electrode of the present invention is used for spot welding, the weldment can readily be obtained which is joined by a flattened nugget having a relatively smaller nugget thickness than that in the conventional ones.

Thus, when using the electrode according to the present invention in which the material and the form are matched, the frequency of cleaning (such as dressing or reform) and exchange of electrodes, etc., can be reduced while suppressing the deformation and wear of the electrode, and the formation of a stable nugget and the production of a weldment can be achieved. Moreover, use of the electrode may reduce the component composition change in the vicinity of the outer surface of the spot-welded sheets (weldment) and in the nugget, and the weldment having originally expected characteristics (such as strength and corrosion resistance) can readily be obtained. Thus, according to the welding method of the present invention, a weldment excellent in the appearance and characteristics can be stably or efficiently obtained.

«Others»

Unless otherwise stated, a numerical range "x to y" as referred to in the present description includes the lower limit x and the upper limit y. Any numerical value included in various numerical values or numerical ranges described in the present description may be selected or extracted as a new lower or upper limit, and any numerical range such as "a to b" can thereby be newly provided using such a new lower or upper limit.

BRIEF DESCRIPTION OF DRAWINGS

FIG. 1A is a set of cross-sectional views of electrode tips used for spot welding.

FIG. 2 is a graph illustrating the relationship between a nugget flattening level and an increased amount of Cu.

FIG. 4 is a set of views illustrating an analysis model according to the simulation of spot welding, the energization and pressing force patterns, and the analysis result (temperature distribution).

EMBODIMENTS FOR CARRYING OUT THE INVENTION

Figure 1B:
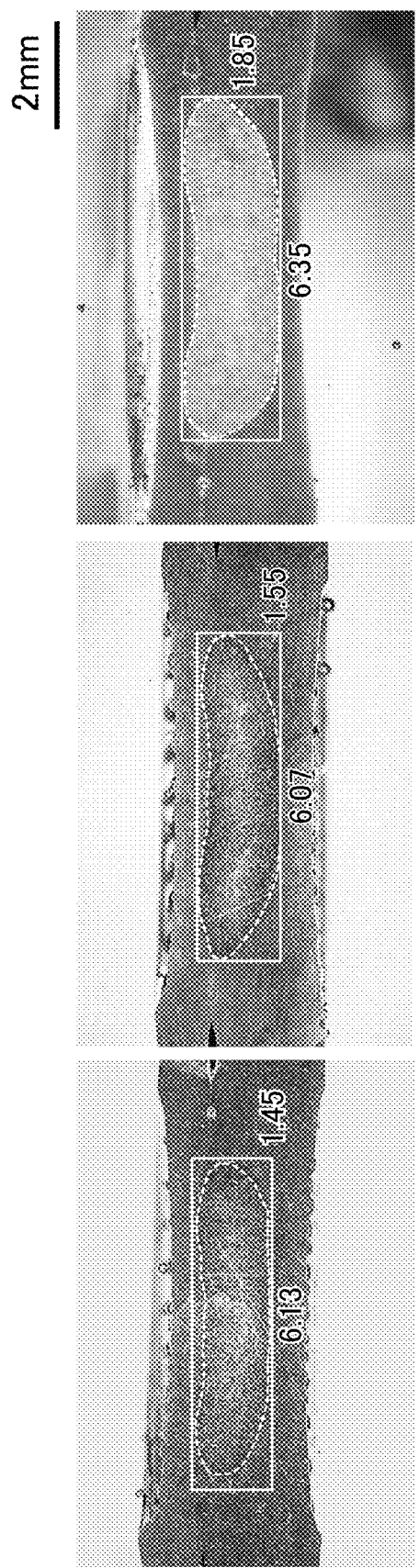
FIG. 1B is a set of cross-sectional photographs of nuggets obtained when the electrodes are used to perform spot welding.

One or more features freely selected from the present description can be added to the above-described features of the present invention. The contents described in the present description can be applied not only to the weldment but also to a welding method and an electrode or electrodes and the like used in the welding method. Which embodiment is the best or not is different in accordance with objectives, required performance, and other factors.

«Workpieces to be Joined»

(1) Material

The sheet materials, which are typical examples of the workpieces to be joined, may be made of, for example, aluminum or its alloy, iron or its alloy (in particular, steel), or other similar material. The sheet materials made of iron (alloy) may be, for example, (high-tensile) steel sheets plated with zinc or Al—Si. The zinc-plated steel sheets may be, for example, non-alloy hot-dip galvanized steel sheets (GI), alloyed hot-dip galvanized steel sheets (GA), electrogalvanized steel sheets (EG), or other similar plated steel sheets. When the sheet materials before welding are aluminum (alloy) sheets, plated steel sheets as described above, or the like, Al and/or Zn exist on the (both) outer surface parts of the weldment.

The sheet materials to be joined may be the same material or different materials. The sheet materials may be those that have undergone plastic working, such as press forming, before being joined. The high-tensile steel sheets as referred to in the present description are steel sheets having a tensile strength (fracture strength) of 440 MPa or more in an embodiment or 590 MPa or more in another embodiment if they are daringly defined. The high-tensile steel sheets are not limited in the type and may be any of precipitation-hardened steel sheets, DP steel sheets, transformation-induced plasticity (TRIP) steel sheets, hot-stamped steel sheets, and other similar steel sheets.

(2) Form

The workpieces to be joined by spot welding may be, for example, two (a pair of) stacked sheets or may also be three or more stacked sheets. The sheet thicknesses may be the same or different. When the sheet thicknesses are different, the nugget diameter as an index is calculated on the basis of the minimum sheet thickness (t). When welding sheet materials having nonuniform (distributed) sheet thicknesses, the nugget diameter and other parameters are calculated on the basis of the sheet thickness of a site in which the nugget is formed. The sheet thickness used for calculation of the nugget diameter is the initial sheet thickness before spot welding (before contact with an electrode). The initial thickness is, for example, about 0.4 to 4 mm.

«Nugget»

(1) Shape

The nugget, which is a melted and solidified part, has a shape that reflects the tip portions of electrodes (in particular, the pressure-contact surfaces of tip bottom parts to be in contact with the outer surfaces of the sheet materials). When the contact surfaces with the sheet materials are circular flat surfaces or curved surfaces (e.g., substantially spherical surfaces), the nugget has a substantially disk shape.

In the present description, the size of a nugget is called a "nugget diameter" regardless of the shape of the nugget (whether the shape is circular or the like). The nugget diameter (D) is defined as the maximum length of the nugget which is measured along the extending direction of the sheet materials on the basis of the cross-sectional image or other similar image of the welded part. The nugget thickness (H) is also defined as the maximum height of the nugget which is measured in the thickness direction of the sheet materials (direction orthogonal to the measurement direction of the nugget diameter) regardless of the shape of the nugget. Unless otherwise stated, the "welded part" as referred to in the present description includes at least the nugget and sheet material portions (unmelted portions including the outer surface parts) located on both sides of the nugget within a region (dented region) that has been in pressure contact with the electrodes.

The nugget diameter and the nugget thickness are specified, for example, as follows. First, the profile line of the nugget which appears on the cross-sectional image is specified. A circumscribed rectangle of the profile line is drawn. The length of the long side of the rectangle is taken as the nugget diameter (D), and the length of the short side is taken as the nugget thickness (H). When the number of the welding site is one, each measurement may be performed on the basis of any of cross-sectional images that pass through the approximate center of the welded part (in the direction orthogonal to the sheet materials). When the number of the welding sites is two or more, each measurement may be performed on the basis of a cross-sectional image that passes through the approximate centers of the welded parts and extends in the direction in which the welded parts are arranged.

(2) Joint Strength

It is known that the joint strength (peel strength, shear strength/see JIS Z3136, Z3137) of a weldment is substantially determined by the nugget diameter (strictly, the circumferential length of the nugget). In a weldment having a sufficient nugget diameter or joint strength, the fracture surface does not propagate into the nugget and plug fracture occurs in a portion of the mother materials (sheet materials). Rough indication of the plug fracture is that the nugget diameter is preferably $4\sqrt{t}$ or more in an embodiment, $5\sqrt{t}$ or more in another embodiment, or $6\sqrt{t}$ or more in still another embodiment when using the previously described sheet thickness (t).

(3) Nugget Flattening Level (D/H)

The nugget flattening level is the ratio of a nugget diameter to a nugget thickness. The nugget flattening level is preferably 3.5 to 8 in an embodiment, 3.8 to 6 in another embodiment, or 4 to 5 in still another embodiment. A weldment having an unduly high nugget flattening level is in a state of less weld penetration, so that the weldment may readily fracture at the interface and it may be difficult to ensure the sufficient joint strength. Moreover, the production itself of such a weldment may also be difficult. On the other hand, if the nugget flattening level is unduly low, the temperature at the contact interfaces between the electrodes and the sheet materials may not be sufficiently reduced, and compounds may readily be generated at the contact interfaces. It can thus be considered that the shape of a nugget is correlated with the temperature at the contact interfaces between the electrodes and the workpieces to be joined and/or the generation of compounds.

«Electrodes»

(1) Form

Each electrode for resistance spot welding (simply referred to as an "electrode") may be one that can be detachably attached to a shank (a cap tip-type electrode) or may also be one that is integrated with a shank (an integrated-type electrode). The following description will be made mainly with reference to a cap tip-type electrode (also referred to as an "(electrode) tip") with which the welding cost can be reduced.

The electrode (tip) includes a main body having a tip portion and a base portion. The tip portion is formed in a bottomed and substantially cylindrical shape, and the base portion is formed in a substantially cylindrical shape and merges into the tip portion. The tip portion has a tip bottom part and a tip barrel part. The tip bottom part has a pressure-contact surface that is not recessed with respect to a workpiece to be pressed, and the tip barrel part is formed in a substantially cylindrical shape and merges into the tip bottom part. The tip bottom part has the (convex) pressure-contact surface, which is not recessed with respect to a workpiece to be joined, on the outer surface side. The specific form (size) of each part or portion is as follows. The size of an electrode is usually defined on the basis of the outer diameter (B/base diameter/nominal diameter) of the base portion; therefore, also in the present description, the form of each part or portion will be defined using a ratio to the outer diameter (B).

First, the tip inner diameter ratio (f/B), which is the ratio of the inner diameter (f) of the tip barrel part to the outer diameter (B) of the base portion, may be, for example, 0.4 to 0.6 in an embodiment or 0.44 to 0.56 in another embodiment. If the tip inner diameter ratio is unduly small, the circulation of a cooling medium (cooling liquid/cooling water) in the tip barrel part will be deteriorated, and the cooling efficiency can be lowered. If the tip inner diameter ratio is unduly large, the outer circumferential side wall will be thin, and deformation such as buckling may readily occur due to the strength reduction and the increase in the amount of self-heating caused by the decrease in current paths (increase in resistance).

When the inner diameter (f) of the tip barrel part is not constant, the maximum value is taken as the inner diameter (f). The outer diameter (B) of the base portion is defined as the maximum outer diameter of a portion at which the electrode is fitted with a shank. In the case of the integral type, the maximum outer diameter of the tip portion to be in contact with a workpiece to be joined is employed.

Next, the tip bottom thickness ratio (L/B), which is the ratio of the thickness (L) of the tip bottom part to the outer diameter (B) of the base portion, may be, for example, 0.15 to 0.5 in an embodiment, 0.2 to 0.4 in another embodiment, or 0.25 to 0.35 in still another embodiment. This allows the nugget (flattened nugget) to be readily obtained with a high flattening level, which can reduce the welding adhesion between the electrode and the sheet material and suppress the deformation/wear of the electrode, etc.

The thickness (L) of the tip bottom part is a distance from the deepest position (inner bottom surface) of the tip barrel part to the outermost tip position of the tip bottom part. When the thickness (L) of the tip bottom part is not constant, the minimum value is usually taken as the thickness (L). The inner bottom surface of the tip portion (inner upper surface of the tip bottom part) may be, for example, a moderately curved surface, a conical surface, or a substantially flat surface. When the inner bottom surface is substantially flat, the cooling performance of the tip portion is satisfactory and a flattened nugget can readily be obtained.

The tip height ratio (H/B), which is the ratio of the height (H) of the tip portion to the outer diameter (B) of the base portion, may be, for example, 0.6 to 0.9 in an embodiment or 0.7 to 08 in another embodiment. If the tip height ratio is unduly large, deformation such as buckling may readily occur at the tip portion. If the tip height ratio is unduly small, the reformable region will be reduced and the electrode life may be shortened.

The height (H) of the tip portion is a distance from the opening end (upper end) position of the tip barrel part to the outermost tip position of the tip bottom part. When the height (H) of the tip portion is not constant, the maximum value is usually taken as the height (H). The depth (D) of the tip barrel part can be obtained from the height (H) of the tip portion and the thickness (L) of the tip bottom part (D=H−L). The depth (D) of the tip barrel part is a distance from the opening end (upper end) position of the tip barrel part to its deepest position. The tip inner depth ratio (D/B), which is the ratio of the depth (D) of the tip barrel part to the outer diameter (B) of the base portion, may be, for example, 0.1 to 0.75 in an embodiment or 0.2 to 0.6 in another embodiment.

The total height ratio (T/B), which is the ratio of the height (T) of the main body (base portion and tip portion) to the outer diameter (B) of the base portion, may be, for example, 1.2 to 2.4 in an embodiment or 1.4 to 2 in another embodiment. The base height ratio (G/B), which is the ratio of the height (G) of the base portion to the outer diameter (B) of the base portion, may be, for example, 0.3 to 1.8 in an embodiment or 0.6 to 1.2 in another embodiment. The height (G) of the base portion is obtained from the height (T) of the main body and the height (H) of the tip portion (G=T−H), so the portion obtained by excluding the tip portion from the main body may also be defined as the base portion.

Examples of the basic shape of convex electrodes (tip portions) include those as defined in JIS C9304 (1999) in large numbers, such as a flat shape (F-type), a radius shape (R-type), a dome shape (D-type), a dome radius shape (DR-type), a cone frustum shape (CF-type), and a cone frustum radius shape (CR-type). Any shape can be employed, but the DR-type or F-type is preferred because the strength and the cooling ability are balanced when a small cooling hole is provided.

The base portion and the inner cylindrical part of the tip barrel part constitute a flow path for a cooling medium (such as cooling liquid/cooling water). This allows the electrode to be forcibly cooled from the inside, and the weldment is also cooled through the pressure-contact surface of the tip bottom part.

The inner cylindrical part of the tip barrel part is formed from the opening end side of the base portion. The inner cylindrical part of the base portion, therefore, has a size equal to or larger than that of the inner cylindrical part of the tip barrel part. That is, the minimum value ($e_{min}$) of the inner diameter (e) of the base portion is not less than the maximum value ($f_{max}$) of the inner diameter (f) of the tip barrel part.

The inner cylindrical part of the tip barrel part is formed, for example, by cutting work with an end mill or other similar tool or plastic working (forging work) with a punch or other similar tool. The main body may be a forged component in which grain-flow lines extend in the direction along from the base portion to the tip portion. The electrode forged in such a manner has high strength in terms of the metallographic structure and also has a long life because the deformation and wear are suppressed.

The term "substantially cylindrical" as referred to in the present description has a meaning, to consider a draft of punch by forging or the like, that encompasses not only a case in which the circumferential side surface (wall) is parallel to the central axis (inclined angle to the central axis: $\theta=0°$), but also a case of a tapered shape ($\theta \leq 10°$ in an embodiment or $\theta \leq 5°$ in another embodiment). The tapered surface may also be a curved surface along the central axis.

(2) Material

The electrode main body (at least the tip portion) is made of a copper alloy excellent in the conductivity and strength. The electrical conductivity (simply referred to as "conductivity") of the copper alloy may be 75% to 95% IACS in an embodiment or 80% to 90% IACS in another embodiment. Pure copper with high conductivity has low strength. A copper alloy with unduly low conductivity is softened by self-heating when energized and may readily be deformed during spot welding.

The unit "% IACS" refers to a ratio of the electrical conductivity (or electrical resistance) to that of the international annealed copper standard (IACS). The volume resistivity of the annealed copper standard having an electrical conductivity (conductivity) of 100% IACS is defined as $1.7241 \times 10^{-2}$ μΩm.

The copper alloy refers to those other than pure copper (such as oxygen-free copper, tough pitch copper, or phosphorus-deoxidized copper). If daring to say, the composition has a purity of 99.8% or less (0.2% or more of alloy elements in an embodiment or 0.5% or more of alloy elements in another embodiment). Examples of the alloy elements include Cr, Zr, and Be. Specific examples of the copper alloy include chromium copper, zirconium copper, chromium-zirconium copper, alumina-dispersed copper, and beryllium copper. For example, it is preferred to use chromium copper (Cr: 0.5 to 1.4 mass %, Cu: the balance) excellent in the electric conductivity and strength. Such an electrode material may be selected in accordance with JIS Z3234 (Class 2) or Group A (Class 2) of the Resistance Welder Manufacturer's Association (RWMA).

When the electrode made of a copper alloy comes into contact at a high temperature with a workpiece to be joined (sheet material) in which Al or Zn exists at least in the surface part, both metals can react in the vicinity of the contact interface to generate a compound or alloy. For example, the 0 phase on the Cu—Al binary phase diagram, the Q phase on the Cu—Zn binary phase diagram, or other similar phase may be generated.

Fortunately, however, when a flattened nugget is formed using the electrode of the present invention, the temperature rise at the contact interface is suppressed, and the generation of an intermetallic compound and the like is also suppressed. This can suppress the penetration of elements (such as Cu), which deteriorate the corrosion resistance, into the welded part (outer surface part and/or nugget) and can also suppress the generation of such a compound. At the same time, wear and deformation of the electrode are also suppressed. Thus, according to the present invention, it is possible to obtain a weldment excellent in the appearance and characteristics (such as joint strength and corrosion resistance) while increasing the life of the electrode and prolonging the interval or the like of maintenance such as reform or dressing.

«Weldment»

According to the electrode of the present invention, the reaction with the sheet material at the contact interface is suppressed, and a weldment with a small component composition change in the welded part can be obtained. For example, when spot welding is performed using the electrode made of a copper alloy, the increased amount of Cu in the welded part remains at 0.2 mass % or less in an embodiment, 0.15 mass % or less in another embodiment, or 0.1 mass % or less in still another embodiment, with respect to the component composition of the sheet material before the spot welding. In such a weldment, the deterioration or the like of corrosion resistance in the welded part caused by the diffusion or the like of Cu can be suppressed.

The increased amount of Cu as referred to in the present description is specified as a difference of Cu obtained from the component composition of the welded part and the component composition before the spot welding. The amount of Cu before welding is obtained from the initial composition of the sheet materials. The amount of Cu in the welded part is specified as follows. Chips generated by drilling using a φ3 mm drill are collected from four sites in a circular region of φ8 mm (approximately corresponding to a region in which the nugget exists inside) near the center of the outer surface of the welded part. These chips are subjected to the Inductively Coupled Plasma (ICP) emission spectroscopic analysis thereby to specify the Cu concentration (component composition) of the welded part. The analyzer to be used may be, for example, PS3520UVDDII available from Hitachi High-Tech Science Corporation.

«Welding Condition»

The welding condition can be appropriately adjusted. For example, the welding current value may be 20 to 60 kA in an embodiment or 30 to 50 kA in another embodiment. The welding current may be alternating current or may also be direct current. The power source for the welding current may be a constant current power source or may also be a constant voltage power source, but a desired nugget may be readily and stably formed using the constant current power source.

When the electrode of the present invention is used, the pressing force can be, for example, 2 to 10 kN in an embodiment or 3 to 8 kN in another embodiment. The energization time is adjusted in accordance with the type or the like of the workpiece to be joined and may be, for example, 10 to 800 ms in an embodiment or 20 to 400 ms in another embodiment.

EXAMPLES

First Example

«Production of Samples»
(1) Workpieces to be Joined

Strip-shaped (30 mm×100 mm) sheet pieces (sheet materials) of aluminum alloy sheets (A6016) having sheet thicknesses of 0.9 mm and 2.0 mm were prepared as workpieces to be joined by spot welding.

(2) Electrodes

Electrode tips of three DR-types (JIS C9304) as illustrated in FIG. 1A were prepared as the electrodes for performing spot welding. Each of electrodes 1 comprises a main body 10 having a bottomed cylindrical tip portion 11 and a substantially cylindrical base portion 12. The tip portion 11 has a tip bottom part 111 and a tip barrel part 112. The tip bottom part 111 has a pressure-contact surface 111c formed of a convex surface on the outer surface side. The convex surface is formed with no recess. The pressure-contact surface 111c comes into contact with a workpiece to be joined.

The inner circumferential side surface of the tip barrel part 112 is formed of a cylindrical surface having the same diameter (straight) from an upper end opening 112a to a flat inner bottom surface 112b (the inner upper end surface of the tip bottom part 111). The inner circumferential side surface of the base portion 12 is formed of a conical surface (tapered surface) that is moderately reduced in the diameter from an upper end opening 12a to a lower end surface 12b. The upper end opening 112a of the tip barrel part 112 merges into the lower end surface 12b of the base portion 12. Note, however, that the inner diameter (f) of the upper end opening 112a of the tip barrel part 112 is smaller than the inner diameter of the lower end surface 12b of the base portion 12. The "upper/lower (direction)" as referred to in the present embodiment is used for descriptive purposes and does not limit the orientation (direction) in which the electrode is actually used.

Each of electrodes C is a commercially available electrode tip made of chromium copper (Cr: 1 mass %, Cu: the balance) (available from OBARA Corporation). The electrical conductivity of this chromium copper alloy is 80% IACS. The dimensions of the electrodes C are as follows:

Outer diameter (base diameter) of base portion: B=φ16 mm,

Thickness of tip bottom part (tip thickness): L (H)=12 mm (H/B=0.75),

Inner diameter of upper end opening: e=about φ13 mm,

Height of main body (total height): T=23 mm (T/B=1.44, G/B=0.69),

Diameter of pressure-contact surface (tip diameter): d=φ8 mm (pressure-contact surface is spherical surface of radius: R=40 mm), and Radius of rounded corner: r=8 mm.

The electrode 1 is obtained by engraving the inner bottom part of the electrode C into a cylindrical shape along the central axis using an end mill to form the tip barrel part 112. Similarly, the electrode 2 is produced by engraving the inner bottom part of the electrode C into a cylindrical shape using a drill. Due to the difference of the working tool, the inner bottom surface 112b of the electrode 1 is flat while the inner bottom part of the electrode 2 is conical. The thickness (L) of tip bottom parts and the inner diameter (f) of tip barrel parts of the electrodes 1 and 2 were variously changed. Except for the tip portions, the dimensions of the electrodes 1 and 2 are the same as those of the electrodes C. Indication of each dimension is as illustrated in FIG. 1A. The inner diameter of tip barrel parts was set to f=8 mm (f/B=0.5) unless otherwise stated (i.e., except the third embodiment which will be described later).

(3) Spot Welding

Spot welding was performed as follows using the electrodes having different shapes or specs. The above-described two sheet pieces having different sheet thicknesses are stacked, and a pair of the same electrodes is disposed opposite to each other on both outer sides of the sheet pieces. The sheet pieces are energized in a state in which the tip portions of the electrodes are in pressure contact with the outer surfaces of the sheet pieces. Unless otherwise stated, welding conditions were welding current value: 39 kA, electrode pressing force: 5 kN, and energization time (welding time): 32 msec. Spot welding was performed while supplying cooling water (water amount: 3 L/min) from a hose for electrode cooling (outer diameter: φ6 mm) to the inside of each electrode.

«Observation/Measurement»
(1) Nugget Flattening Level

After each weldment obtained by spot welding was cut at the center and mirror-polished using emery paper and alumina abrasive grains, etching treatment was performed using an aqueous solution of sodium hydroxide to observe the cross section. FIG. 1B shows cross sections of a weldment (Sample 11) using electrodes 1 (L=3 mm: L/B=0.188), a weldment (Sample 21) using electrodes 2 (L=3 mm: L/B=0.188), and a weldment (Sample C1) using electrodes C (L=12 mm: L/B=0.75). The thickness of the tip bottom part is also simply referred to as a "tip thickness." The tip thicknesses of the electrodes 1 and 2 are also referred to as L1 and L2, respectively.

The nugget flattening level (D/H) was calculated through drawing a circumscribed rectangle of the profile line of a nugget appearing in each cross section and taking the lengths of the long side and short side of the rectangle as the nugget diameter (D) and the nugget thickness (H), respectively. The results are listed together in FIG. 1B.

(2) Increased Amount of Cu

A weldment (Sample 12) using electrodes 1 (L=5 mm: L/B=0.312), a weldment (Sample 13) using electrodes 1 (L=3 mm: L/B=0.188), and a weldment (Sample C2) using electrodes C (L=12 mm: L/B=0.75) were separately produced. The increased amount of Cu (mass %) in the surface part of each sample was calculated on the basis of the component compositions before and after spot welding. The component composition of the sheet pieces (mother materials) was used for the component composition before welding. The component composition of the welded part after welding was specified by the previously described method. The results thus obtained are summarized in FIG. 2. The Cu source is a copper alloy that constitutes the electrodes.

«Evaluation»
(1) Nugget Flattening Level

As apparent from FIG. 1B, it has been found that the use of electrodes 1 and 2 having the tip bottom thickness ratios within a predetermined range allows flatter nuggets to be formed as compared with the case of using the conventional electrodes C.

(2) Increased Amount of Cu

As apparent from FIG. 2, it has been found that, as the nugget flattening level becomes higher, the increased amount of Cu decreases and it is possible to reduce the amount of Cu migrating from the electrode side to the weldment side (such as due to diffusion and/or compound generation). From this, it can be said that the weldment having a high nugget flattening level is suppressed in the deterioration of corrosion resistance attributable to Cu or a Cu compound/alloy.

«Discussion»

(1) Correlation

It can be considered that the electrode shape, the increased amount of Cu, and the nugget shape are related to one another as follows.

Figure 3:
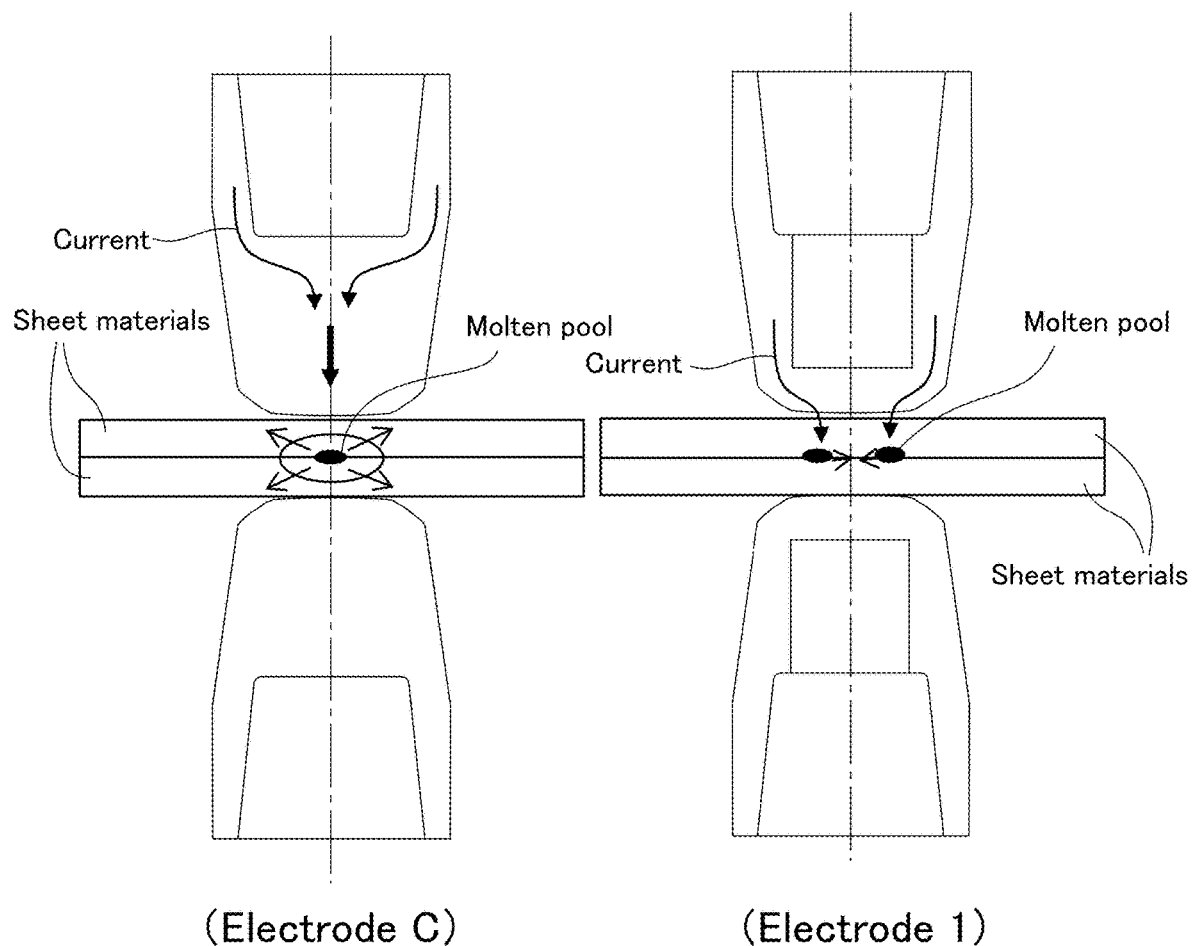
FIG. 3 is a set of explanatory views illustrating the influence of the electrode shape on the formation process of a molten pool (nugget).

First, as illustrated in FIG. 3, when spot welding is performed using the conventional electrodes C, the current supplied to the electrodes C is concentrated at the central part and flows into the sheet materials, and melting starts from the central part inside the sheet materials. The molten pool thus generated in the central part expands and grows in the horizontal direction (extending direction of the sheet materials) while maintaining the similarity.

When the molten pool is grown in the horizontal direction in order to ensure the nugget diameter with which the desired joint strength is obtained, the molten pool inevitably grows also in the vertical direction (toward the surfaces of the sheet materials). The grown molten pool reaches near the surface parts of the sheet materials in contact with the electrodes and raises the temperature of the contact interfaces between the electrodes and the sheet materials. As a result, diffusion or melting reaction, etc. may readily occur between the constituent metals of the electrodes (mainly Cu) and the constituent metals of the sheet materials (e.g., Al and/or Zn). This causes Cu to readily migrate from the electrode side to the sheet material side, and the amount of Cu tends to increase at least at the outer surface part of the welded part.

In the nugget formed by solidification of the molten pool as the above, the nugget flattening level (D/H) is relatively low because the nugget thickness (H) increases as the nugget diameter (D) increases.

It can be said that the spot weldment thus obtained using the conventional electrodes has a low nugget flattening level and contains a large amount of Cu which causes the deterioration of corrosion resistance. In this case, the wear and deformation of the electrodes may readily occur; therefore, the frequency of cleaning and exchange of electrodes increases, and the production cost of the spot weldment also increases.

On the other hand, when spot welding is performed using the electrodes 1 having a tip bottom thickness ratio (L1/B) within a predetermined range as illustrated in FIG. 3, the current supplied to the electrodes 1 is dispersed and flows mainly into the sheet materials from the outer circumferential regions of the tip portions, and melting starts from the inner peripheral region or regions of the sheet materials. In cooperation with the improved cooling ability of the electrodes 1, an annular molten pool or discrete molten pools are generated on the outer circumferential side and grow horizontally toward the center side of the sheet materials. The molten pool or pools having undergone such a growth process do not maintain the similarity when growing, and the horizontal growth and the vertical growth are not cooperative. That is, even though the molten pool or pools grow in the horizontal direction, the growth in the vertical direction is suppressed. As a result, the rise in the temperature of the contact interfaces between the electrodes and the sheet materials is also suppressed, and the reaction at the contact interfaces between the electrodes and the sheet materials is less likely to occur. This can reduce the amount of Cu diffusing from the electrode side to the sheet material side.

In the nugget formed by solidification of the molten pool as the above, the nugget flattening level (D/H) is relatively high.

It can be said that the spot weldment thus obtained using the electrodes having the tip bottom thickness ratio (L/B) within a predetermined range has a high nugget flattening level and contains a small amount of Cu which causes the deterioration of corrosion resistance. In this case, the wear and deformation of the electrodes can be suppressed; therefore, the frequency of cleaning and exchange of electrodes is reduced, and the production cost of the spot weldment is also reduced.

The joint strength of the spot weldment is determined by the nugget diameter, and the nugget thickness does not affect the joint strength. Accordingly, even in the case of a weldment having a relatively high nugget flattening level (relatively small nugget thickness), sufficient joint strength can be ensured if the nugget diameter (D) is not less than a predetermined value (D≥4√t). The description is made herein with reference to an example of the electrodes 1 for descriptive purposes, but the above-described contents can also be applied to the electrodes 2 illustrated in FIG. 1A and other similar electrodes.

(2) Analysis

To confirm the above-described discussion, simulation was conducted using resistance welding simulation software SORPAS for the appearance when spot welding was performed. FIG. 4 collectively illustrates an analysis model used in this simulation, the energization and pressing force patterns, and the analysis result (temperature distribution). In this simulation, the tip bottom thickness ratio (L/B) of the electrodes was set to 0.19. The material of the electrodes was a copper alloy (Cu—Cr) and the material of the sheet materials was an aluminum alloy (A6016).

As a result of the analysis, it has been confirmed that the temperature of the contact interfaces between the electrodes and the sheet materials is 458° C., which is lower than the eutectic temperature of Cu—Al (548.2° C.).

The same simulation was also conducted for the case in which spot welding was performed using the conventional electrodes (see the electrode C of FIG. 1A) having a tip bottom thickness ratio (L/B) of 0.75. In this case, the temperature of the contact interfaces between the electrodes and the sheet materials was 586° C., which is higher than the eutectic temperature of Cu—Al.

Second Example

The influence of the shape of electrodes (tip bottom thickness ratio) on the welding adhesion property of the electrodes to the sheet materials and the deformation property (wear resistance) of the electrodes was evaluated as follows.

«Electrodes»

The previously described electrodes C (B=φ16 mm, L=12 mm, L/B=0.75) illustrated in FIG. 1A and electrodes 1 (B=φ16 mm) to which end milling was variously applied were prepared. The tip thickness (L1) of the electrodes 1 was any of 2 mm (L1/B=0.125), 3 mm (L1/B=0.1875), 5 mm (L1/B=0.3125), and 7 mm (L1/B=0.4375).

«Spot Welding»

Spot welding was repeatedly performed using these electrodes on the previously described stacked sheet materials. The applied current value was variously changed in a range of 35 to 50 kA. Other welding conditions were as previously described.

«Evaluation»

(1) Welding Adhesion Property

Figure 5A:
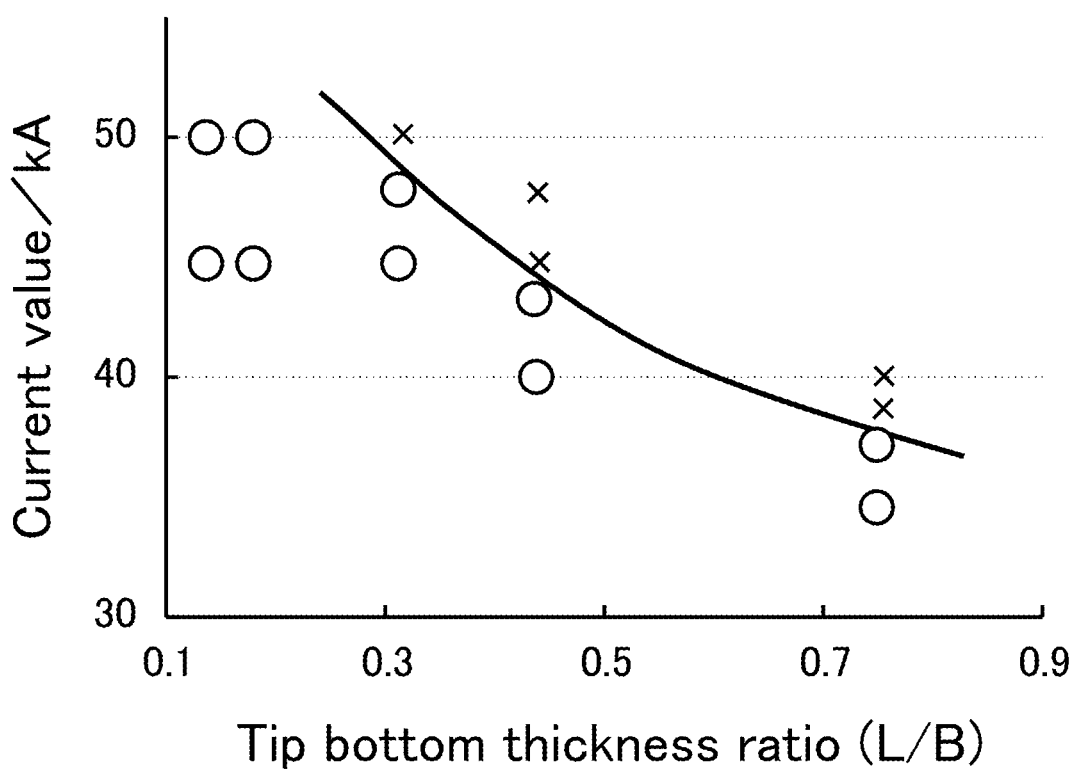
FIG. 5A is a scatter diagram illustrating the influence of the electrode shape on the welding adhesion property.

For each combination of the electrodes and the current value, spot welding was repeatedly performed at 25 points at once without reforming the electrodes. The interval between the points was 1 sec. FIG. 5A collectively illustrates the cases with indication of "x" in which strong welding adhesion occurred to such an extent that the welding was not able to be performed and the cases with indication of "○" in which the spot welding was able to be performed at 25 points.

As apparent from FIG. 5A, it has been revealed that the use of electrodes having a small tip thickness (tip bottom thickness ratio) allows the spot welding to be sequentially performed with less welding adhesion and without reforming the electrodes even when the current value is increased. It can be considered that the fact that excellent resistance to the welding adhesion is exhibited as the tip thickness (tip bottom thickness ratio) of electrodes decreases is because, as previously described, a molten pool and thus a nugget having a high flattening level are readily formed.

(2) Deformation Property

Figure 5B:
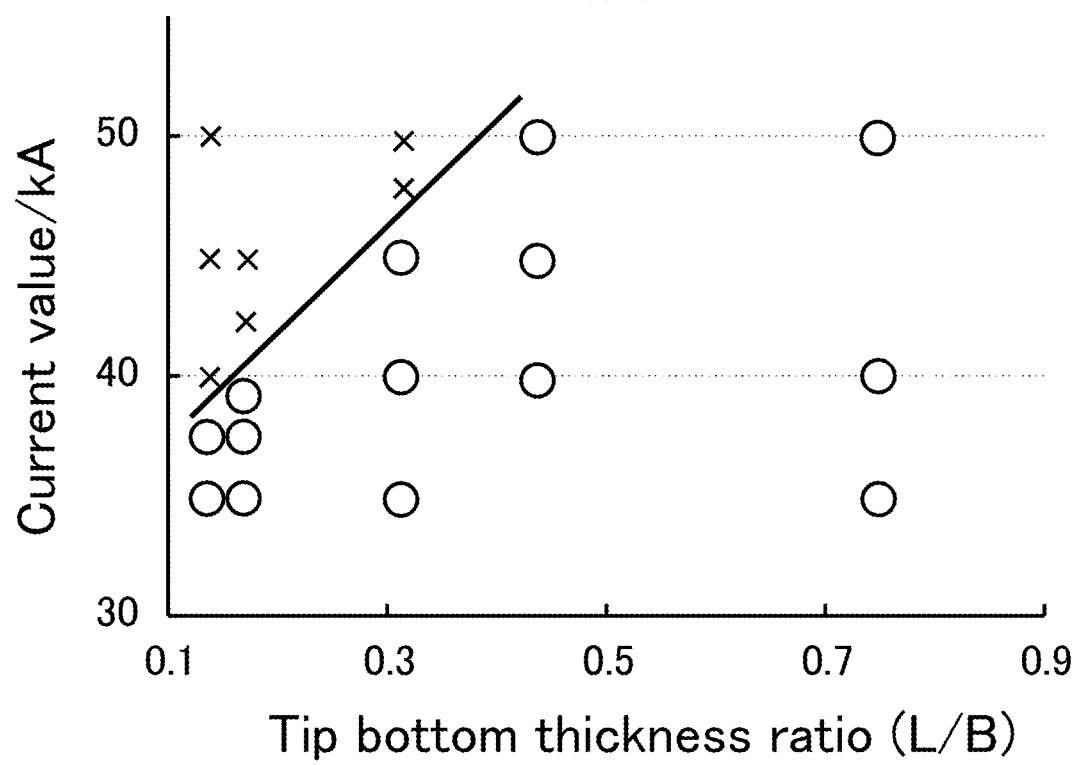
FIG. 5B is a scatter diagram illustrating the influence of the electrode shape on the deformation property.

For each combination of the electrodes and the current value, spot welding was performed at 1,000 points. In this operation, reform (dressing) of the electrodes was performed once every 12 points. The interval between the points was 1 sec. FIG. 5B collectively illustrates the cases with indication of "x" in which the deformation amount of electrodes after spot welding at 1,000 points was not less than 0.5 mm and the cases with indication of "○" in which the deformation amount was less than 0.5 mm. The deformation amount of electrodes as referred to herein means a displacement amount of the tip portions of electrodes toward the shank side (reduction amount of the protrusion amount) due to the plastic deformation (such as depression) of the tip portions caused by the sequential spot welding.

As apparent from FIG. 5B, it has been revealed that the use of electrodes having an unduly small tip thickness (tip bottom thickness ratio) causes the electrodes to be readily deformed or worn when the current value is increased.

From the above, it has been revealed that the spot welding can be stably performed using the electrodes having the tip bottom thickness ratio within a predetermined range while suppressing the occurrence of welding adhesion and the deformation of electrodes, for example, within the range of a current value of 39 kA or less.

Third Example

The influence of the shape of electrodes (tip inner diameter ratio) on the welding adhesion property of the electrodes to the sheet materials and the deformation property (wear resistance) of the electrodes was evaluated as follows.

«Electrodes/Spot Weldment»

Electrodes 1 (B=φ16 mm, L=3 to 8 mm, L/B=0.19 to 0.5) were prepared by variously changing the inner diameter (f) of the tip barrel part 112 illustrated in FIG. 1A. Using these electrodes, spot welding was performed on the previously described stacked sheet materials. The applied current value was set to 34 to 50 kA. Other welding conditions were as previously described. The state of each electrode after spot welding at 1,000 points was observed/evaluated. Reform (dressing) of the electrodes was performed once every 12 points. The interval between the points was 1 sec.

«Evaluation»

Figure 6:
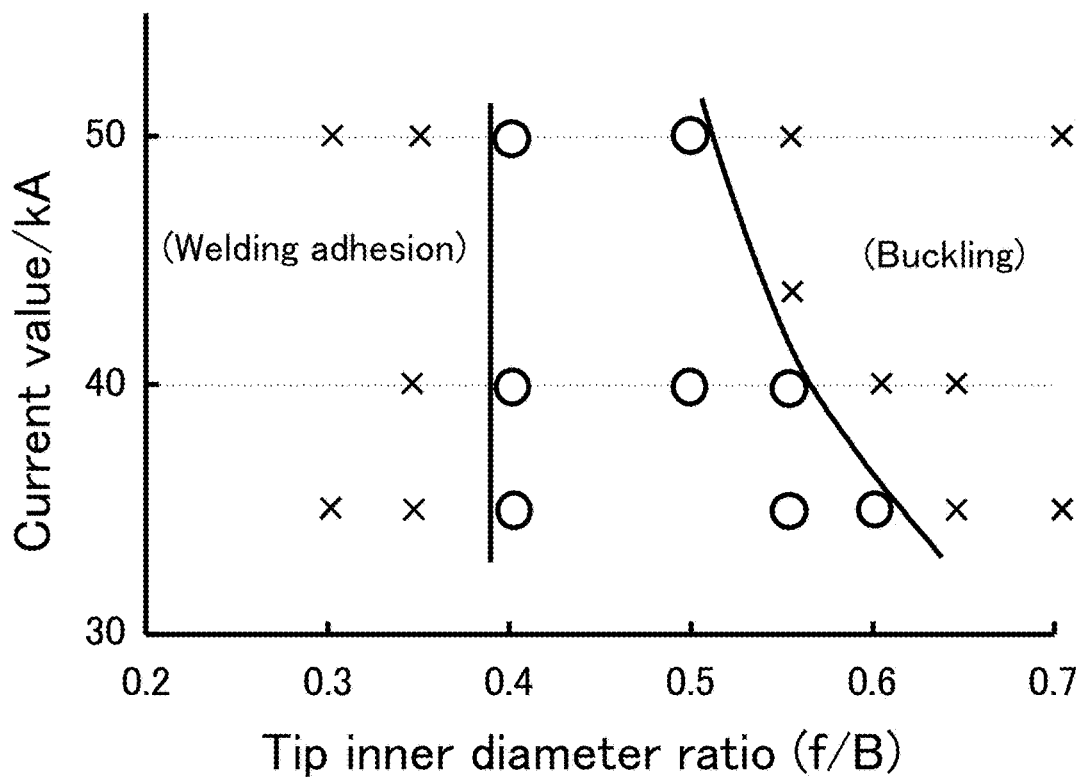
FIG. 6 is a scatter diagram illustrating the influence of the electrode shape on the welding adhesion property and the deformation property.

FIG. 6 collectively illustrates the state of each electrode after spot welding at 1,000 points. Indication of "x" in FIG. 6 means the cases in which sequential welding was not able to be performed due to the melting reaction between the pressure-contact surfaces 111c and the sheet materials (workpieces to be joined) or the cases in which deformation (buckling) occurred in the tip barrel parts 112 due to the sequential welding, and indication of "○" means the cases without any of the above troubles.

As apparent from FIG. 6, when the tip inner diameter ratio (f/B) was unduly small (less than 0.4), welding adhesion occurred between the electrodes and the sheet materials. This appears to be because the circulation of cooling water in the tip portions was bad and the cooling efficiency was lowered. On the contrary, when the tip inner diameter ratio (f/B) was unduly large (more than 0.6), buckling occurred in the electrodes (tip portions). This appears to be attributable to the effect of softening due to the reduced strength and the self-heating (resistance heat generation) because the circumferential side walls of the tip barrel parts are thin.

From the above, it has been revealed that the spot welding can be stably performed using the electrodes having the tip inner diameter ratio within a predetermined range while suppressing the occurrence of welding adhesion and the deformation of electrodes.

<Others>

Figure 7:
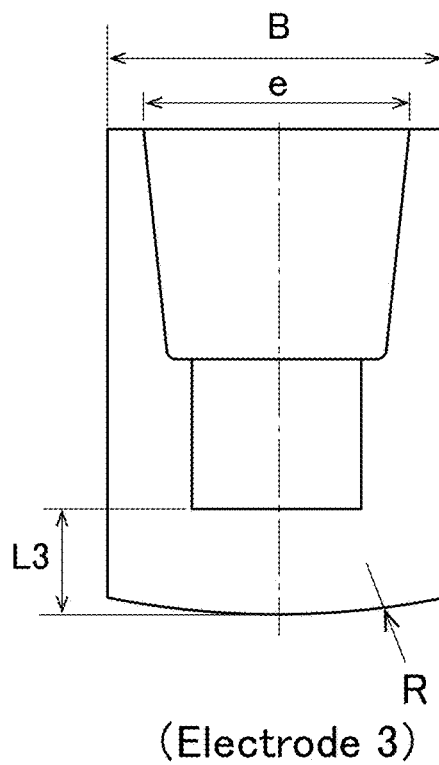
FIG. 7 is a cross-sectional view of an electrode tip having a different shape.

The above-described contents can also be applied to the case of using any of electrodes (tips), such as F-type, R-type, D-type, CF-type, and CR-type electrodes (tips), instead of the DR-type electrodes (tips) as exemplified in FIG. 1A. FIG. 7 illustrates an electrode 3 that is an example of the R-type electrode. The electrode 3 is obtained by cold forging of a chromium copper material and setting the tip bottom thickness ratio (L3/B) within a predetermined range. As in FIG. 1A, symbols illustrated in FIG. 7 have the same meanings of B: outer diameter (base diameter), e: inner diameter, and R: radius of curvature of tip spherical surface.

DESCRIPTION OF REFERENCE NUMERALS

1 Electrode
10 Main body
11 Tip portion
12 Base portion
111 Tip bottom part
112 Tip barrel part

The invention claimed is:

1. A spot weldment joined by a nugget formed inside stacked sheet materials, the nugget being formed through bringing a pair of electrodes arranged opposite to each other into pressure contact with the stacked sheet materials from outside and energizing the stacked sheet materials from the electrodes, the nugget having a nugget diameter (D) satisfying D≥4√t (t: thickness of sheet material) and a nugget flattening level (D/H) of 3.5 to 8, the nugget flattening level (D/H) being a ratio of the nugget diameter (D) to a nugget thickness (H), the nugget thickness (H) being a maximum height of the nugget which is measured in a direction orthogonal to a measurement direction of the nugget diameter (D), wherein both outer surface parts of the sheet materials are free from protrusions formed due to bulging of molten metal.

2. The spot weldment as recited in claim 1, wherein the electrodes are made of a copper alloy, and an increased amount of Cu in a welded part is 0.2 mass % or less with respect to a component composition before the spot welding.

3. The spot weldment as recited in claim 2, wherein at least an outer surface part of the welded part contains Al or Zn.

4. A method for forming the spot weldment according to claim 1, the method comprising performing spot welding using an electrode comprising a main body having a tip portion and a base portion, the tip portion being formed in a bottomed and substantially cylindrical shape, the base portion being formed in a substantially cylindrical shape and merging into the tip portion, the main body of the electrode comprising a copper alloy, the tip portion having a tip bottom part and a tip barrel part, the tip bottom part having a pressure-contact surface that is not recessed with respect to a workpiece to be pressed, the tip barrel part being formed in a substantially cylindrical shape and merging into the tip bottom part, the electrode having a tip inner diameter ratio (f/B) of 0.4 to 0.6, the tip inner diameter ratio (f/B) being a ratio of an inner diameter (f) of the tip barrel part to an outer diameter (B) of the base portion, the electrode having a tip bottom thickness ratio (L/B) of 0.15 to 0.5, the tip bottom thickness ratio (L/B) being a ratio of a thickness (L) of the tip bottom part to the outer diameter (B) of the base portion.

5. The spot welding method as recited in claim 4, wherein the copper alloy has an electrical conductivity of 75% to 95% IACS.

6. The spot welding method as recited in claim 4, wherein an increased amount of Cu in the welded part of the spot weldment is 0.2 mass % or less with respect to a component composition before the spot welding.

7. The spot welding method as recited in claim 4, wherein at least an outer surface part of the welded part of the spot weldment contains Al or Zn.

8. The spot welding method as recited in claim 4, wherein the copper alloy is chromium copper.

9. The spot welding method as recited in claim 4, wherein a welding current value is 20 to 60 kA or an electrode pressing force is 2 to 10 kN.

* * * * *